(12) United States Patent
Eastman et al.

(10) Patent No.: US 8,180,275 B2
(45) Date of Patent: May 15, 2012

(54) COMPUTER BASED MULTI-CHANNEL RADIO SYSTEM AND USER INTERFACE

(75) Inventors: Neil S. Eastman, Delray Beach, FL (US); Michael Zingman, Marietta, GA (US); Michelle Sammartino, Boca Raton, FL (US)

(73) Assignee: Sirius XM Radio Inc., New York, NY (US)

( * ) Notice: Subject to any disclaimer, the term of this patent is extended or adjusted under 35 U.S.C. 154(b) by 1931 days.

(21) Appl. No.: 10/626,244

(22) Filed: Jul. 24, 2003

(65) Prior Publication Data

US 2005/0020238 A1    Jan. 27, 2005

(51) Int. Cl.
*H04H 20/74*    (2008.01)

(52) U.S. Cl. ............... 455/3.02; 455/3.06; 455/12.1; 455/427

(58) Field of Classification Search .............. 455/3.02, 455/3.04, 3.06, 12.1, 13.1, 427, 428; 725/134, 725/142, 62, 63; 348/552, 731
See application file for complete search history.

(56) References Cited

U.S. PATENT DOCUMENTS

| | | | | |
|---|---|---|---|---|
| 6,510,317 | B1 * | 1/2003 | Marko et al. | 455/428 |
| 6,522,342 | B1 * | 2/2003 | Gagnon et al. | 715/716 |
| 6,549,774 | B1 * | 4/2003 | Titlebaum et al. | 455/427 |
| 6,553,077 | B2 | 4/2003 | Rindsberg et al. | |
| 6,904,264 | B1 * | 6/2005 | Frantz | 455/3.04 |
| 7,010,263 | B1 * | 3/2006 | Patsiokas | 455/3.02 |
| 7,020,217 | B1 * | 3/2006 | Parsons et al. | 375/316 |
| 7,078,609 | B2 * | 7/2006 | Georges | 84/645 |
| 7,194,687 | B2 * | 3/2007 | Sezan et al. | 715/719 |
| 2002/0049037 | A1 * | 4/2002 | Christensen et al. | 455/3.06 |
| 2002/0049717 | A1 * | 4/2002 | Routtenberg et al. | 707/1 |
| 2002/0055343 | A1 * | 5/2002 | Stetzler et al. | 455/260 |
| 2002/0057367 | A1 * | 5/2002 | Baldock | 348/554 |
| 2003/0041334 | A1 * | 2/2003 | Lu | 725/113 |
| 2003/0043184 | A1 * | 3/2003 | Hilt et al. | 345/727 |
| 2004/0049779 | A1 * | 3/2004 | Sjoblom et al. | 725/13 |
| 2004/0103297 | A1 * | 5/2004 | Risan et al. | 713/200 |
| 2004/0196179 | A1 * | 10/2004 | Turnbull | 342/357.06 |
| 2004/0266336 | A1 * | 12/2004 | Patsiokas et al. | 455/3.04 |
| 2005/0020223 | A1 * | 1/2005 | Ellis et al. | 455/186.1 |

FOREIGN PATENT DOCUMENTS

WO        WO0116840 A1 *   3/2001

* cited by examiner

*Primary Examiner* — Sujatha Sharma
(74) *Attorney, Agent, or Firm* — Kramer Levin Naftalis & Frankel LLP

(57) ABSTRACT

A computer based multi-channel radio system (200) can include a computer (214) coupled to a display (215) and having a graphical user interface (500) and a radio receiver (100) coupled to the computer for receiving a plurality of channels and data associated with the plurality of channels. The graphic user interface can selectively display at least a portion of the data associated with the plurality of channels. The data associated with the plurality of channels can be simultaneously updated. The radio receiver can include an output port (207) that enables the system to stream data or audio or video from a selected channel among the plurality of channels.

26 Claims, 5 Drawing Sheets

800

COMPUTER BASED MULTI-CHANNEL RADIO SYSTEM AND USER INTERFACE

CROSS-REFERENCE TO RELATED APPLICATIONS (not applicable)

FIELD OF THE INVENTION

The invention relates generally to a radio system and interface, and more particularly to a computer controlled radio and graphical user interface.

BACKGROUND OF THE INVENTION

Satellite radio operators having been providing digital quality radio broadcast services covering the entire continental United States. These services offer approximately 100 channels, of which nearly 50 channels in a typical configuration will provide music with the remaining stations offering news, sports, talk and data channels. Digital radio may also be available in the near future from conventional analog radio broadcasters that will provide a terrestrial based system using signals co-located in the AM and FM bands.

Satellite radio has improved terrestrial radio's potential by offering a better audio quality, greater coverage and fewer commercials. Accordingly, in October of 1997, the Federal Communications Commission (FCC) granted two national satellite radio broadcast licenses. The FCC allocated 25 megahertz (MHZ) of the electro-magnetic spectrum for satellite digital broadcasting, 12.5 MHz of which are owned by Sirius Satellite Radio and 12.5 MHz of which are owned by the assignee of the present application "XM Satellite Radio Inc."

The system plan for each licensee presently includes transmission of substantially the same program content from two or more geosynchronous or geostationary satellites to both mobile and fixed receivers on the ground. In urban canyons and other high population density areas with limited line-of-sight (LOS) satellite coverage, terrestrial repeaters broadcast the same program content for improving coverage reliability. Some mobile receivers are capable of simultaneously receiving signals from two satellites and one terrestrial repeater for combined spatial, frequency and time diversity, which provides significant mitigation of multipath interference and addresses reception issues associated with blockage of the satellite signals.

In accordance with XM Satellite Radio's unique scheme, the 12.5 MHZ band will be split into 6 slots. Four slots will be used for satellite transmission. The remaining two slots will be used for terrestrial reinforcement.

In accordance with the XM frequency plan, each of two geostationary satellites transmits identical or at least similar program content. The signals transmitted with QPSK modulation from each satellite (hereinafter satellite 1 and satellite 2). For reliable reception, the LOS signals transmitted from satellite 1 are received, reformatted to Multi-Carrier Modulation (MCM) and rebroadcast by terrestrial repeaters. The assigned 12.5 MHZ bandwidth (hereinafter the "XM" band) is partitioned into two equal ensembles or program groups A and B. Each ensemble will be transmitted by each satellite on a separate radio frequency (RF) carrier. Each RF carrier supports up to 50 channels of music or data in Time Division Multiplex (TDM) format.

Current user interfaces for internet radio broadcasts such as RealPlayer by Real Networks or Windows Media Player by Microsoft typically display information for an internet radio station for a single channel received via the internet and typically require a download. These are not live feeds and use up extensive resources on a CPU of a personal computer. These media players and other software such as vTuner by vTuner.com may sometimes index programming scheduled on different internet radio stations and also allow viewing of "current" programming. To actually listen to such "current" programming requires a connection to a website having the programming, as well as downloading and buffering of the programming. In other words, a URL link needs to be provided that enables a user's computer to connect to a remote server. For example, both Windows Media Player and vTuner have similar options called "Now Playing" or "On Now" where links are provided to various Internet radio stations that have scheduled programming. The granularity of the information provided when requesting a "Now Playing" or "On Now" may not necessarily provide detail to the extent of author or artist, music title and other desired information. Furthermore, the information provided may not be updated frequently enough to account for unscheduled programming changes.

Thus, in a digital audio radio system such as a satellite digital audio radio system or a terrestrial digital audio radio system, a need exists for a system that enables a user to display multiple channels and intelligently select desired content among the many channels in a flexible and user customizable manner using a user interface that overcomes many of the detriments described above.

SUMMARY OF THE INVENTION

A computer based multi-channel radio system and user interface embodied in accordance with the present invention preferably utilizes very minimal system resources of a host computer and does not require access to a remote server for providing output of a selection of multiple channels.

In a first aspect of the present invention, a computer based multi-channel radio system can include a computer coupled to a display and having a graphical user interface and a radio receiver coupled to the computer for receiving a plurality of channels and data associated with the plurality of channels. The graphic user interface can selectively display at least a portion of the data associated with the plurality of channels. The data associated with the plurality of channels can be simultaneously updated. The radio receiver can include an output port that enables the system to stream data or audio or video from a selected channel among the plurality of channels.

In a second aspect of the present invention, a computer based multi-channel radio can include a radio receiver for receiving a plurality of channels and data associated with the plurality of channels over-the-air, a channel decoder coupled to the radio receiver, and a port for transmitting data associated with the plurality of channels, transmitting an output signal representative of a selected channel among the plurality of channels, and for receiving control signals from a computer having a graphical user interface, wherein the graphic user interface selectively displays at least a portion of the data associated with the plurality of channels and user selectively controls the channel decoder by selecting the selected channel on the graphical user display.

In a third aspect of the present invention, a method of representing a plurality of channels on a display can include the steps of extracting data associated with each channel in the plurality of channels, enabling the selective display of the data associated with each of the plurality of channels on a graphical user interface, and selectively controlling a remotely coupled channel decoder on a radio receiver via the graphical user interface.

In a fourth aspect of the present invention, a method of displaying a group of selected channels among a plurality of channels can include the steps of controlling a remote source for receiving a digitally encoded bit stream on at least a portion of the plurality of channels and decoding a selected channel among the plurality of channels. The method can further include the steps of selectively displaying data associated with each of the plurality of channels on a graphical user interface, updating the data associated with the plurality of channels in a rapid recurring succession, and enabling the output of the selected channel as represented by the graphical user interface.

In yet other aspects of the present invention, a computer program can have a plurality of code sections executable by a machine for causing the machine to perform the steps described in either of the methods of the third or fourth aspects described above.

DETAILED DESCRIPTION OF THE DRAWINGS

Figure 1:
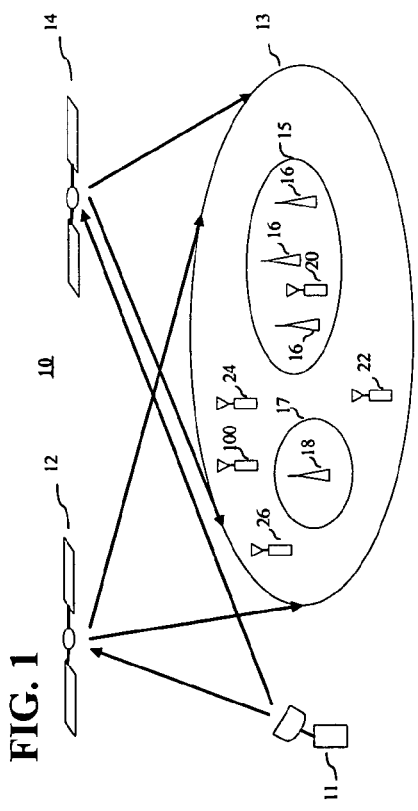
FIG. 1 illustrates an exemplary Satellite digital audio radio service system architecture used in conjunction with the present invention.

Referring to FIG. 1, an exemplary satellite radio system 10 is shown providing digital radio service to a large geographical coverage area 13. Briefly, the service provided by XM Satellite Radio for example includes a satellite X-band uplink (11) to two satellites (12 and 14) which provide frequency translation to the S-band for re-transmission to radio receivers (100, 20, 22, 24, and 26) on earth within the coverage area 13. Radio frequency carriers from one of the satellites are also received by terrestrial repeaters (16 and 18). The content received at the repeaters (16 and 18) is retransmitted at a different S-band carrier to the same radios (20) that are within their respective coverage areas (15 and 17). These terrestrial repeaters facilitate reliable reception in geographic areas where LOS reception from the satellites is obscured by tall buildings, hills, tunnels and other obstructions. The signals transmitted by the satellites (12 and 14) and the repeaters are received by SDARS receivers (20-26) as well as receiver unit (100). As depicted in FIG. 1, the receivers may be located in automobiles, handheld or stationary units for home or office use. The SDARS receivers are designed to receive one or both of the satellite signals and the signals from the terrestrial repeaters and combine or select one of the signals as the receiver output.

Figure 2:
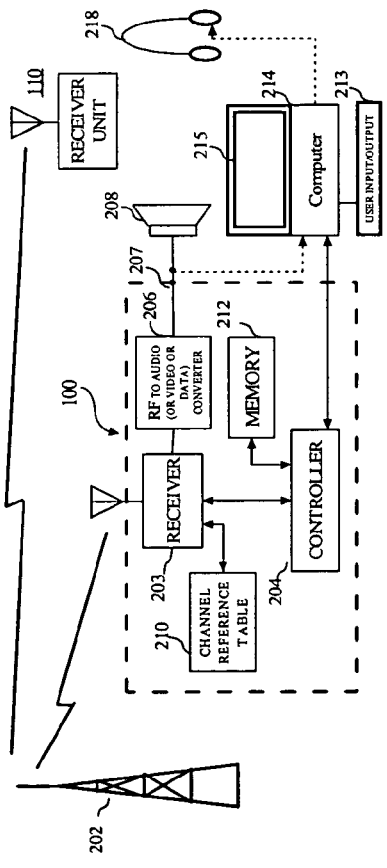
FIG. 2 is a block diagram illustrating a terrestrial based digital audio radio service system architecture in accordance with the present invention.

Referring to FIG. 2, a terrestrial based radio communication system 200 is shown in accordance with present invention. The system 200 preferably comprises a transmission station 202 that transmits signals similar to the repeater stations described above or alternatively could be other transmission formats such as FM, or other modulation techniques suitable for transmission of digital audio. The system 200 also preferably includes a plurality of receiver units (100 and 110 for example) each preferably having a receiver 203, memory 210 and 212 preferably containing a channel reference table and a desired content descriptor list respectively, a controller 204, and a radio frequency to audio (or data or video) converter 206 for playing audio via speaker 208 or providing other types of output to other output devices. The radio receiver 100 can include an output port 207 that enables the system to stream data or audio or video from a selected channel among the plurality of channels. Furthermore, the system 200 can include a computer 214 having a display 215 coupled to the receiver unit 100. The computer 214 can be a desktop or laptop computer having a user input/output 213 (such as keypads, mice, and other displays) coupled to the computer 214. The computer may also provide an output for speakers or a headset 218 as shown.

Figure 3:
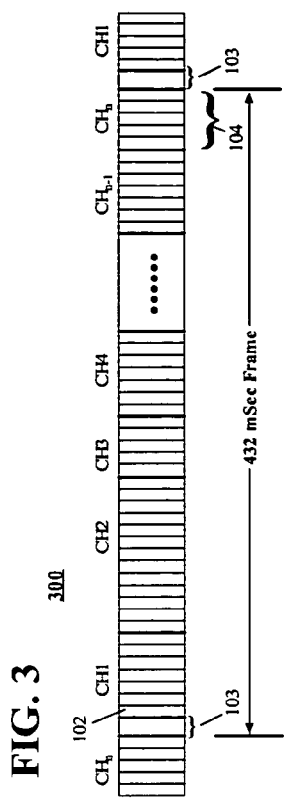
FIG. 3 is a diagram illustrating a representative bit stream in a frame format for distributing data in accordance with the present invention.

Referring to FIG. 3, a plurality of communication resource channels (Channel 1 through n) are shown in accordance with the present invention. In this instance, the over-the-air protocol frame format 300 of the XM Satellite Radio system is shown. This frame format 300 is based on a 432 millisecond frame as shown in FIG. 3 where each frame is subdivided into 8 kilobit per second sub-channels 102. The first two 8 kilobit per second sub-channels of each frame 103 can be assigned to a Time Slot Control Channel (TSCC), which can contain broadcast information about the remaining sub-channels. This broadcast information includes service descriptive data to enable end users to view information pertinent to the services available, such as labels for active services, songs and artists and service categories and also includes format configuration data necessary for receivers to extract a specific service from the frame, such as service-to-sub-channel maps or similar data position indicators, as well as other broadcast data. The remaining sub-channels 102 can be dynamically grouped to form higher bit rate payload channels 104. The payload channel or communication resource 104 provides the necessary bandwidth to transport a high-quality digital audio signal to the listener as well as other data as will become more apparent. When a listener changes channels, a receiver in accordance with the present invention simply extracts a different payload channel from the frame 300. It should be noted that each receiver in the XM Satellite System has a unique identifier allowing for the capability of individually addressing each receiver over-the-air to enable or disable services or to provide custom applications such as individual data services or group data services. The frame can also include a broadcast information channel and/or an Electronic Program Guide among any of the channels 1-n which can contain information about the remaining channels in the frame. Such information can include descriptors such as song title, artist, composer, lyricist, label, album name, genre (e.g., Latin), sub-genre (e.g., Salsa), length, lyric keywords or any combination thereof. Alternatively, each of the channels in the frame can contain such descriptors for its respective channel in an auxiliary data field for example. By extracting such data from each of the channels, a virtual broadcast information channel can be formed. It should be noted that extracting such data from a broadcast information channel would likely be more efficient that extracting similar data from a plurality of channels forming the virtual broadcast information channel.

Figure 4:
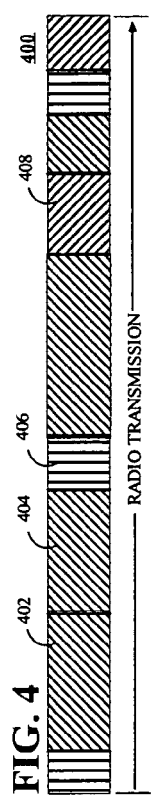
FIG. 4 is another diagram illustrating a typical digital radio broadcast transmission in accordance with the present invention.

Referring to FIG. 4, an illustration of a typical live radio broadcast transmission 400 is shown composed of various content segments representing music (in segments 402 and 404), live talk (segment 406), and information (segment 408) as examples.

Referring to FIG. 2 once again, the receiver unit 100 preferably comprises a receiver 203 and storage media or memory (210 and 212) used to store descriptors corresponding to at least a portion of the plurality of channels received at the receiver unit 100. The memory 212 can store a desired content database that has for example one or more favorite song or artist lists or other descriptors as designated by a user. The memory 210 can store associated channel information or a channel reference table that is updated whenever receiving updated information. In a system using the frame 300 of FIG. 3, descriptors and other data can be updated every 432 millisecond frame. The RF to audio converter block 206 provides access to the real-time over the air content segments. A system controller 204 enables the routing of information and audio to the user, either visually through the display 215 and/or audibly through an audio output. An external speaker 208 coupled to the receiver 100 (and converter 206) can provide an actual audio output or alternatively, the audio output can be routed through the computer before providing an audible output via a headset 218 for example.

Now referring to FIGS. 2 and 5-9, the system 200 can also include a display 215 illustrating a graphical user interface 500 having many user friendly features such as a minimize (and expand) function 520, a compact view function 560, a category tab bar 510, a channel guide 530, a favorite artist function 540, a mute/unmute function 575, a save information function 570, a view saved data function 550, a jump back function 505, a settings function 515, a signal level function 525 as well as a help function. Additionally, the user interface 500 can highlight a current user selected channel as shown by the highlighted item 580. Concurrently, selected data from the current user selected channel can be viewed on a larger viewing area 590. For example, the viewing area can show in a larger font size, the artist's name, the title, channel number, channel name, and category. Other data can be selected or customized to be viewed in the viewing area 590 using the settings function 515 or preferences.

Figure 8:
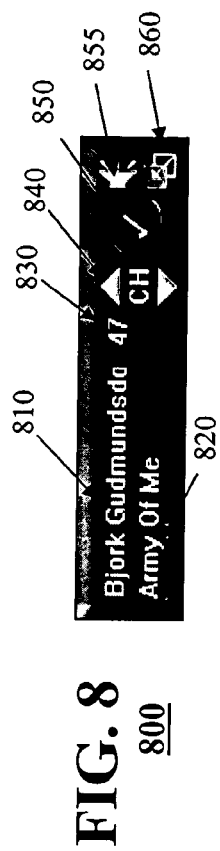
FIG. 8 is a graphical user interface illustrating a compact view player option in accordance with the present invention.

The Minimize function 520 can shrink the graphical user interface 500 from a larger size interface into the Windows task bar of your monitor screen, where it can display the channel number, artist name and, if enough space is available, the song title. Preferably, clicking once on the minimized interface (not shown) restores it to full size. Similarly, a compact view function 560 can shrink the user interface 500 into a small window or compact view 800 on the desktop as shown in FIG. 8. The settings function 515 can enable a user to specify that the compact view 800 always be on top (of other activities on the desktop) by selecting such option. Although there is less viewing area when the user interface is in the compact view, the Channel Number 830, Artist 810 and Song Title 820 can still be seen. The compact view 800 can also enable a user to change channels with the Up and Down arrows buttons 840 which can further include a fast scroll mode when one of the arrows are held down. The compact view 800 can also include a Mute/un-mute function 855, a Save Info function 870, and return to the full size function 860. The user can click the Compact View button (860) on the Compact View 800 to return to full view.

Figure 5:
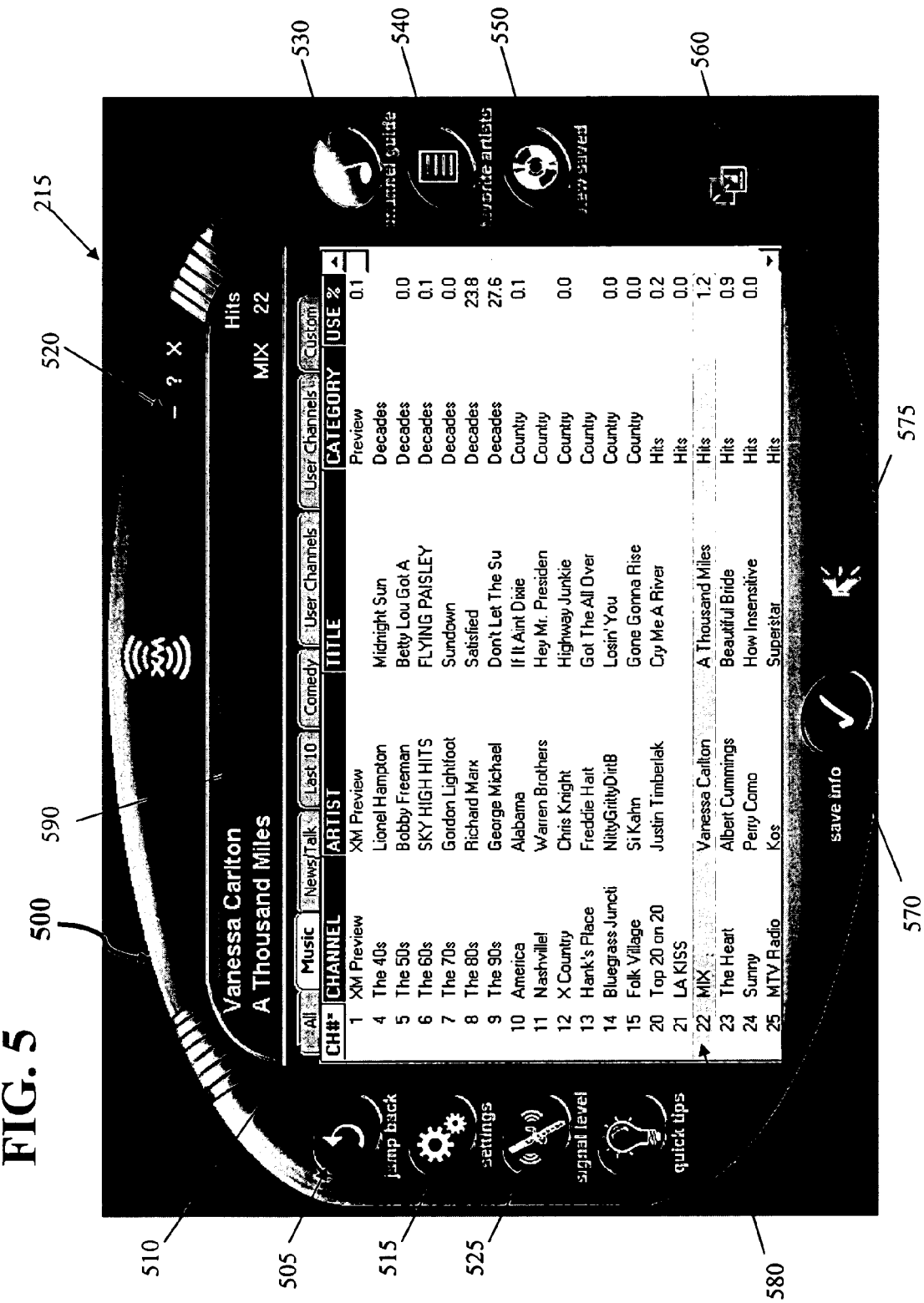
FIG. 5 is a graphical user interface illustrating a simultaneous display of multiple channels in accordance with the present invention.
Figure 9:
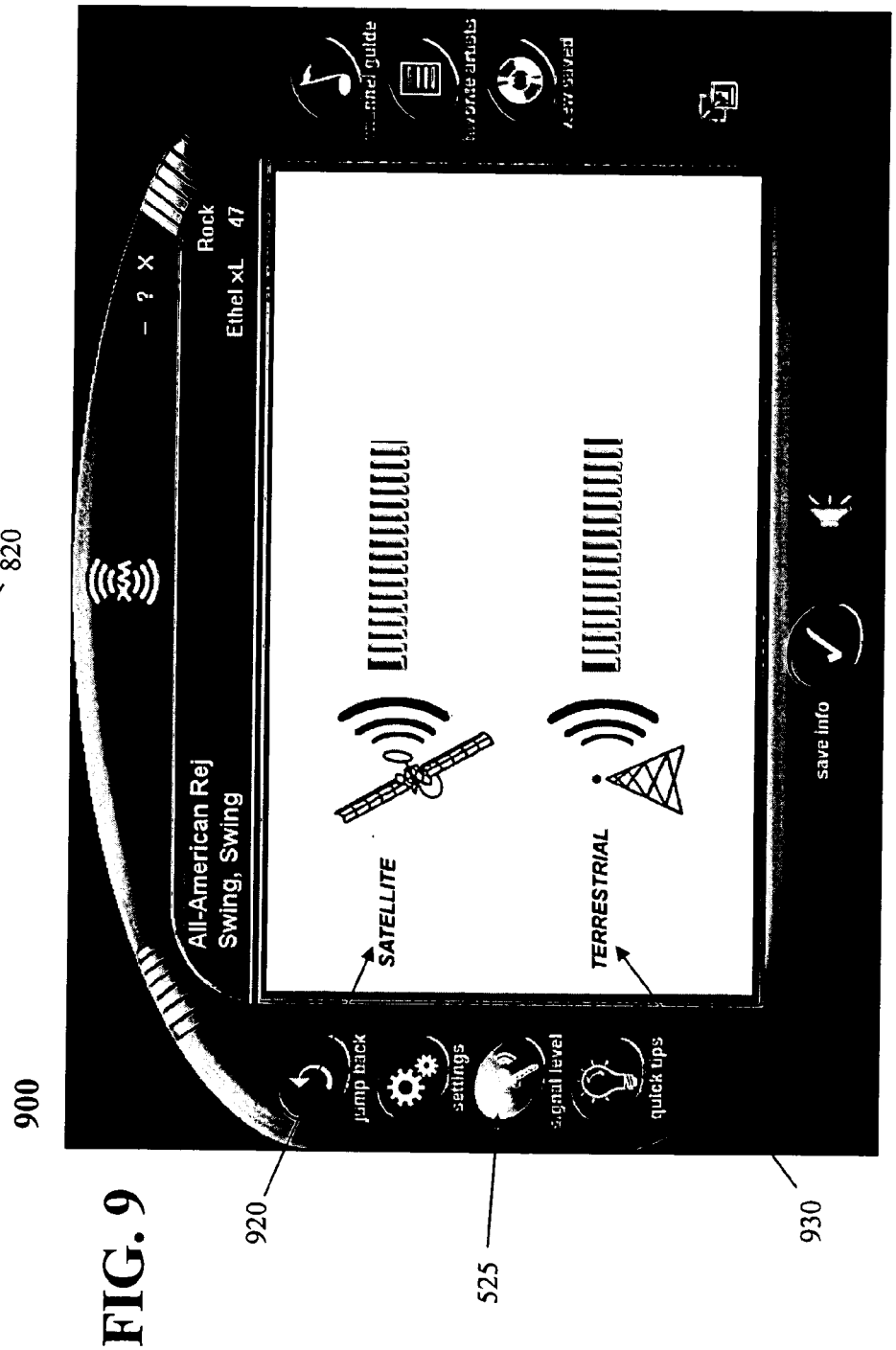
FIG. 9 is a graphical user interface illustrating a signal strength indication at the radio in accordance with the present invention.

Referring to FIGS. 5 and 9 in particular, the signal level function 525 can provide feedback to a user regarding the strength of the signal received at their receiver unit 100 and the ideal positioning of an antenna used with the receiver unit 100. As previously described, the XM system uses two satellites that are positioned above the east and west coasts of the United States in geostationary orbits as well as a network of terrestrial repeaters to augment satellite coverage in some areas where tall buildings and other obstructions might interfere with satellite radio reception. In the XM system, either satellite or a terrestrial signal is sufficient for high quality listening. In order to receive the satellite signal in the XM system, the antenna should ideally be placed near a south-facing window or outdoors with a clear view of the southeastern sky. In some cases it is possible to receive the XM signal through standard home walls or a roof. The signal display 900 will illustrate the signal level strength of at least one or a combination of satellite signals 920. The signal display 900 will also show the signal level strength of the terrestrial signal 930. (Of course, in other systems using multiple FM channel frequencies, additional signal strength view can be provided based on frequency or frequency bands). In any event, the user should continue to vary the antenna(s) position to optimize the signal strength. In an XM system, positioning should ideally be for the strongest satellite signal if satellite signal is available.

Other functions on the graphical user interface (UI) 500 can include the Jump Back function 505 to select the previous channel a user was listening to. It can be used to toggle back and worth between two channels that a user may want to monitor. The "Mute" function 575 on the UI 500 works can operationally work the same as the mute function on a television or other electronic device. A user can click the Mute function to turn off the sound and click it again to restore the sound. The mute function can be implemented by having the computer sending the controller 204 a signal to disable the output from the RF to Audio converter 206.

The settings or preferences function 515 can customize many of the features of the UI 500. For example, the settings functions can include a Full Screen Mode that provides a background color that fills the screen behind the UI 500 and covers other information that may be on the screen 215 or computer monitor. In another mode, the UI 500 can always be kept to appear on top of other applications being used. This would allow a user to change channels while writing a letter, working on a spreadsheet, or performing other functions. Another preference setting can allow the user to set the length of time (after there is no activity) before a special screen saver appears. The special screen saver can display channel number, name, artist and song title. Yet another preference would allow a user to receive a notice when a favorite artist is playing and under specified conditions. For example, the setting can provide that such alert notice never be provided or always be provided or only when the UI 500 is in the foreground on the monitor. (See below regarding Favorite Artists).

Another setting allows a user to set the Last 10 tab so that its corresponding screen displays only channels that the user has listened to for at least a predetermined amount of time as set by the user. Another preference setting allows the user to reset the Use % column on the screen to zero. The UI 500 will start again to calculate how much time the user spends listening to each channel. The settings function 515 can also let the user set how long the UI 500 will save certain information stored as a result of pressing the Save Info button 570 on the main screen or using an Auto Save function. An Export function (not shown) can export data (resulting from data stored using the Saved Info function 570 for example) to other text based applications. One of the user preferences allows a user to create and store favorite artist list. For example, invoking this preference, enable a user to use the Save Info button 570 on the bottom of the main screen to both store the song information and place the artist's name in the active Favorite Artist's list. This is an easy way to create a Favorite Artists list over time, but other methods of creating or editing a Favorite Artists list is also available.

The Saved Information function 570 invokes a Saved Info screen than enables the viewing of information that has been stored. It can contain information such as the Date and Time when the information was stored, the Artist Name, the Song Title, and the Channel information. Song information can be stored manually using the "Save Info" button. Within this screen, right-clicking a list will enable the options to move a list on the Save Info screen to Favorite Artists, Delete List, Delete Entry, and Export to another text application. Selecting the action to Export List can cause the entire Save Info list to be exported to a comma delimited (CSV) file that can later be opened with other applications like Microsoft Excel. In turn, Excel might then be used to sort and print the CSV file. When Export List is selected, a dialogue box can be presented to offer the options to either append to or overwrite the existing list. When clicking on Save Info, the Artist Name, Song Title, Channel Number, Channel Name, and Category of whatever is currently playing will be saved to a file. The Date and Time when a user pressed Save Info will also be saved. To see info that has been saved, click on View Saved button 550. As an option, a user can use Save Info to add the name of the artist currently playing to a Favorite Artists list as will be further detailed below. To activate this option, a user can select a box under Favorite Artists under Settings.

Note that a user can use a keyboard on their computer to control many function related to the UI 500. When the UI 500 is on a main screen or Channel Guide screen, the arrow up and down can move channel selection up and down the screen. Left and right arrows can move from tab to tab across the top of the Channel Guide screen and Page Up and Page Down will move up and down the Channel Guide screen one page at a time. The UI can jump directly to a channel number by typing a number followed by Enter. In a Compact View mode, the Arrow Up and Arrow Down will go up and down from the channel that is currently playing.

The main screen of the UI 500 is called the Channel Guide screen where all of the channels and what they are currently playing are listed. Since a satellite system can include 100 or more channels, a scroll function can allow a user to scroll down or up to see more channels. To select a channel, the user can click once on the row with the desired channel. The UI 500 can include any number of columns representing data. In this instance, there are six columns which display Channel Number, Channel Name, Artist, Song Title, Category and Use % (the percentage of time you have spent listening to each channel). Preferably, the UI 500 enable the user to place the columns in any order by dragging and dropping the column headings and sort listings by any column heading (preferably by just clicking once on the column heading). For example, clicking on Artist will sort the channel listings in alphabetical order by artist name. A special sort column is the USE % column. This column preferably sorts in descending order to force the channels you listen to the most to the top of the list. The default for listing channels can be by Channel Number. So, after shut down or optionally after going to another screen, the return to the Channel Guide Screen will default to listing channels by number. Clicking on a new Tab can also reset the Channel Guide Screen to list channels by number. By default, channels are listed in order by Channel Number, from lowest to highest. But as previously mentioned, the channels can be sorted by Channel Name, Artist, Song Title, Category and Use % (the percentage of time you have spent listening to each channel).

The UI 500 can also include any number of Tabs. In a typical configuration in accordance with an embodiment of the invention, eight tabs are shown: All, Music, News/Talk, Last 10, and four Custom Tabs. The All tab can display every channel received; the Music tab can display only Music channels; the News/Talk tab can display all the news and talk channels; and the Last 10 tab can display the last 10 XM channels that you have listened to. The Custom tabs can be set up to display whatever customized groups of channels desired. The custom tabs can be used like presets that can be assigned to different family members or any new way desired to customize the channel listings.

Figure 6:
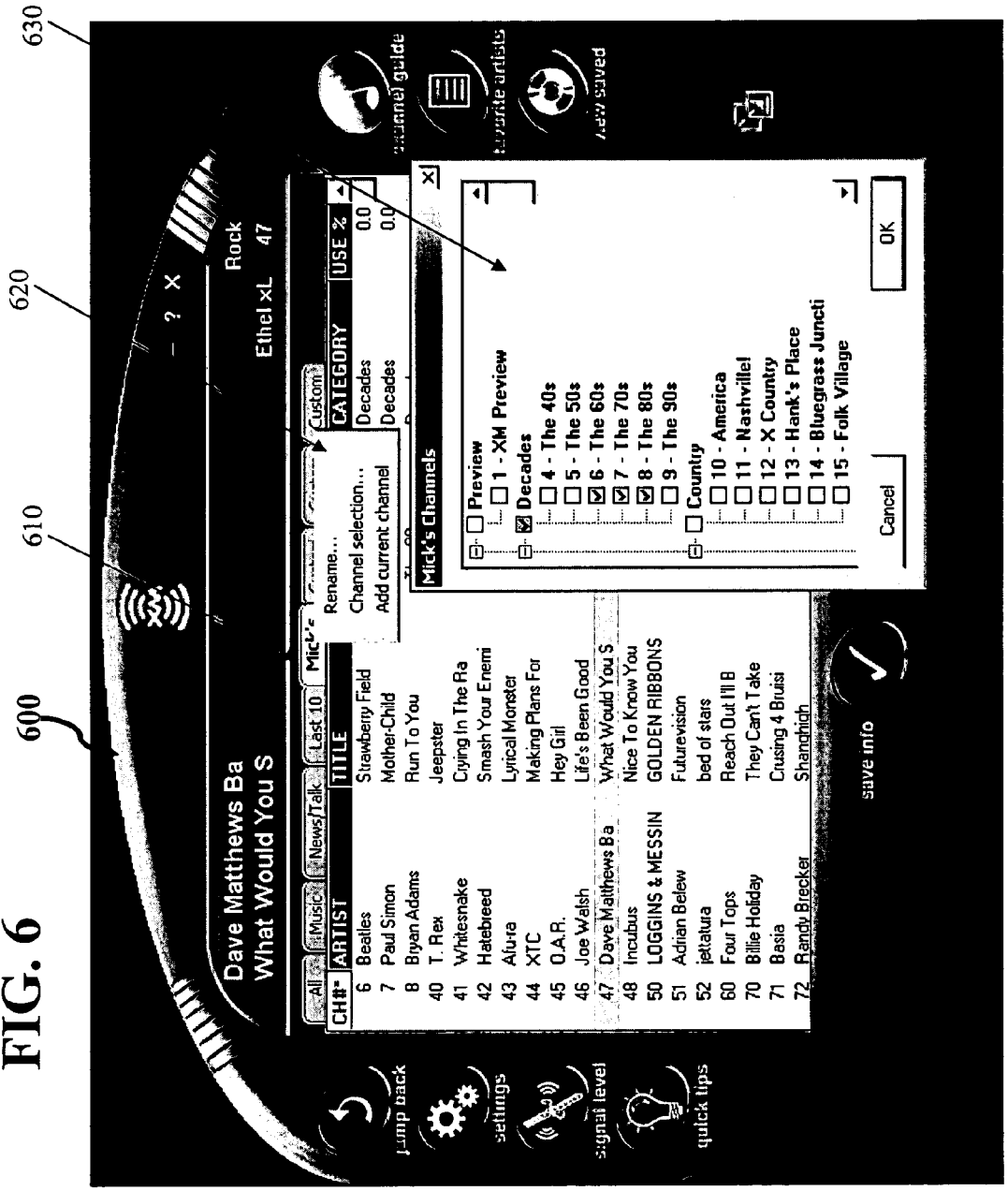
FIG. 6 is a graphical user interface illustrating a preset list of channels for simultaneous viewing in accordance with the present invention.

Referring to FIG. 6, illustrates how tabs can be customized on a UI 600. For example, right-clicking on any of the tabs on the tab bar 610 can enable the renaming of the tab, the selection from a list the channels desired to be included in the custom group, or the addition of a current channel to the custom list as shown by menu 620. If "Channel Selection" is chosen on the menu 620 after right clicking, a pop-up window 630 will appear. Each Category can have a minus sign next to it indicating that the list can be collapsed and expanded by clicking on the minus (or plus once it is collapsed). Double-clicking on the category can also collapse or expand the list. Once a selection is selection is made by clicking on the box next to the channels desired, a user can click on OK at the bottom of the pop-up window. Now, the Custom tab (with whatever custom name given to it) will display only the channels programmed for it. The selected channels for a given Custom Tab can subsequently be changed if desired.

Another customizable feature includes the ability to move columns. Each of the columns (Channel Number, Channel Name, Artist, Song Title, Category and Use %) can be re-arranged in any order desired. For example, the user can list Artist first, followed by Song Title. The user can change the order of the columns by clicking on the column heading and drag it to the new position.

Figure 7:
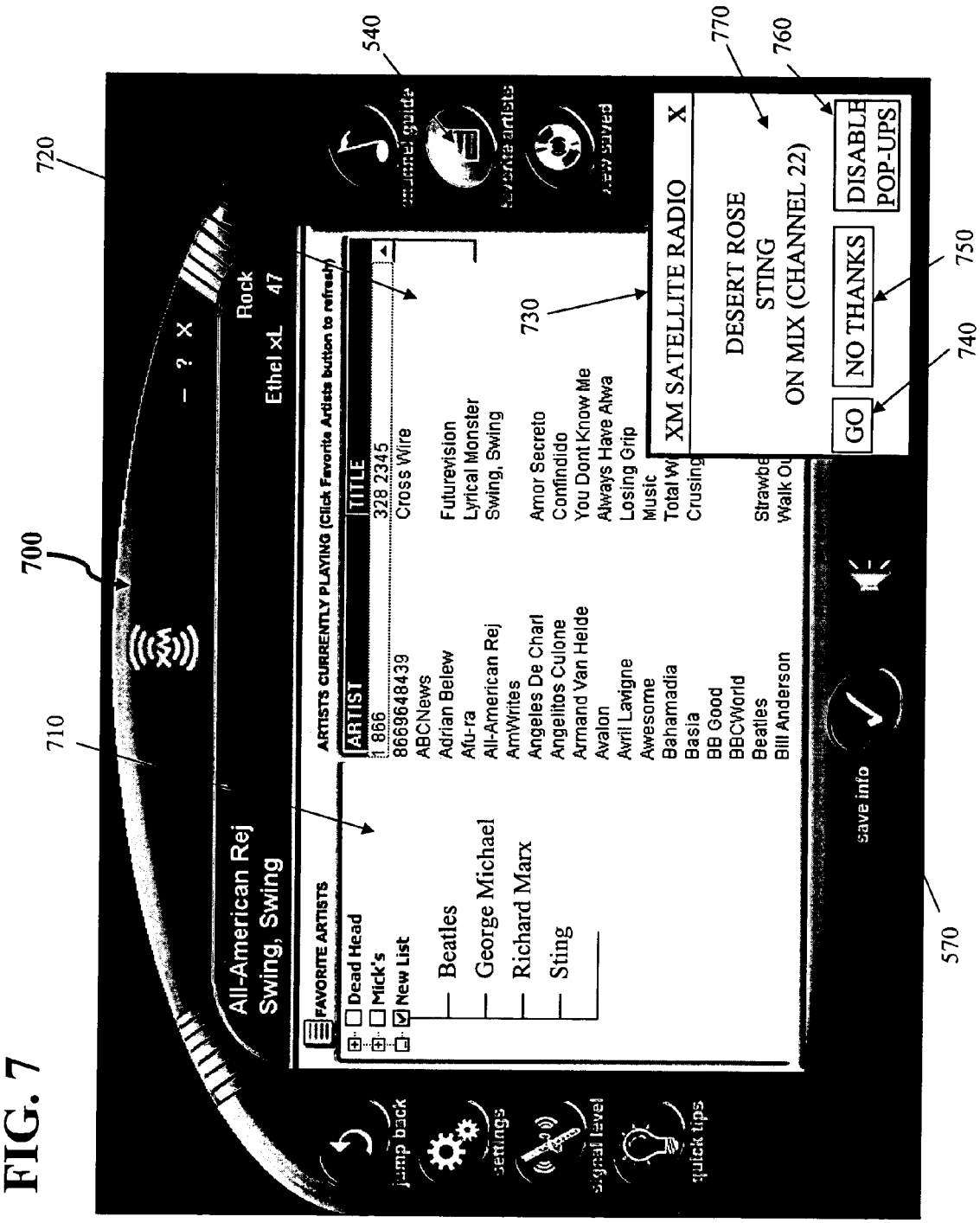
FIG. 7 is a graphical user interface illustrating a favorite artist selection feature in accordance with the present invention.

Referring to FIG. 7, one of the features of the UI is the favorite artists function. A user interface 700 can alert a user with a pop a pop-up window 730 when a favorite artist is performing on any of the plurality of channels available. The pop-up window 730 can be moved (just drag and drop) to any place on the computer screen. The pop-up window 730 will then appear in the same location the next time a favorite artist is playing. When the pop-up window 730 appears, a screen 770 will illustrate can illustrate the artist, title, channel name or channel number and also give a user the selection of options among "Go" (740), "No Thanks" (750) and "Disable Pop-Ups" (760). If "Go" is selected, the UI 700 can either direct the user to the channel the channel where the artist is playing or automatically start playing such channel. If "No" is selected, the pop-up window 730 will disappear. The user can also disable pop-ups by selecting the "Disable Pop-Ups" button or by selecting the same preference under settings. If nothing is done, then the pop-up window 730 will disappear in a few seconds.

Referring once again to FIG. 7, several Favorite Artists lists can be created and they can be created in several ways. For example, in the Favorite Artists List column 710, there are three columns shown, namely, Dead Head, Mick's and New List. To activate a particular Favorite Artists list, the user can, click on the box next to the name of the Favorite List on the left hand side. To create a Favorite Artists List, a user can click the "Favorite Artists" button on the main screen and then right click anywhere on the left side of the Favorite Artist screen. Select "New List" and type in the name for the list. There are generally two main ways to add artist names to a Favorite Artists list. In one instance, on the right side of the Favorite Artists screen is a list 720 of Artists Currently Playing. The user can click on an artist name, drag it over to the left side of the screen and drop it in the Favorite's list. (To refresh the Artists Currently Playing list simply hit the "Favorite Artists" button again). In another instance, a user can use the Save Info button 570 on the main screen. The Save Info button 570 can both save song info to a list (View Saved Info 550) and add the artist currently playing to your Favorite Artists list. To activate this feature, the user can go into Settings and check the box under Favorite Artist.

Additionally, a user can copy names from one list to another (right click on the name, choose Copy, then Paste the name in the other list). A user can also move a name from one list to the other (drag and drop the name from one list to the other using left click). Also, the user can add names from the Saved Info screen by clicking on the View Saved button 550 on the main screen, right-click an artist on the list and select Move To Favorite Artists.

The UI also enables the editing of Favorite Artists Lists. To rename a list, a user can right-click the list to be renamed, select Rename, and type the new name. To delete a list, a user can right-click the list and select Delete. To delete an artist name from a Favorite Artists list, a user can right-click the name to be deleted and select Delete.

In an example illustrating the Favorite Artists function, the Saved Info button 570 can allow a user to input their preferences in the type of content by a single key press. For example, if the user is listening to Aaron Copeland's "Appalachian Spring" on a channel 17, a single button press could enter descriptors into memory 210 or 212 (or alternatively in a memory on the computer 214) indicating that the user prefers to listen to music by Aaron Copeland or to American classical music for example. If the live broadcast on channel 18 contains Aaron Copeland's "Fanfare for the Common Man" or channel 27 contains "Rodeo", then such choices could be alerted to the user via display or alternatively by speaker.

Operationally, the system 200 described above can receive a digitally encoded bit stream over-the-air on a plurality of channels, wherein the digitally encoded bit stream is preferably a satellite digital audio radio system (SDARS) signal containing the plurality of channels, although the it should be understood that the bit stream could also be a digital audio radio signal transmitted by other means such as terrestrial FM stations. The system can then selectively decode a selected channel among the plurality of channels as directed by a user using the UI 500. Optionally, a user can selectively tag a desired type of content on the selected channel. The step of tagging preferably comprises the step of storing a descriptor or descriptors as previously described in a memory containing a desired content database. The system can then analyze a broadcast information channel and/or an Electronic Program Guide for an indication of content of the desired type, preferably by comparing a stored descriptor(s) in memory with a descriptor(s) in a broadcast information channel and/or an Electronic Program Guide for an indication of content of the desired type among the plurality of channel. Preferably, the broadcast information channel and/or Electronic Program Guide is updated frequently to present the user with the most up-to-date content information about the plurality of channels. The update can occur in a rapid recurring manner. For example, in the XM system, the updates can occur as quickly as every frame or 432 milliseconds. These updates would then be provided to the user and be virtually instantaneous. Thus, the plurality of channels are updated with the latest data and such updated data for each of the selected channel can be viewed simultaneous via the UI 500.

A user is alerted of a channel or channels containing an indication of the content of the desired type by ideally displaying or audibly communicating such channel number or numbers and other related data to the user. The display or audible alert can serve as a prompt to the user to enter an input UI 500 to select such channels containing the desired content. Alternatively, the alert can comprise the automatic selection of the channel containing the content of the desired type.

The description above is intended by way of example only and is not intended to limit the present invention in any way except as set forth in the following claims.

We claim:

1. A computer based multi-channel radio system, comprising:
   a computer coupled to a display and having a graphical user interface; and
   a single digital audio radio receiver coupled to the computer for selectively receiving a plurality of channels and data associated with the plurality of channels from a single data stream over the air,
   wherein the data associated with the plurality of channels includes a plurality of channel numbers, a plurality of artist names, a plurality of song titles, a plurality of use percentages and a plurality of channel names,
   wherein the computer displays on the graphic user interface, for each of three or more channels from said plurality of channels, a channel number, a channel name, and at least one of a song title, an artist name and a use percentage,
   and wherein such data associated with the plurality of channels is simultaneously updated and displayed on the graphical user interface.

2. The system of claim 1, wherein the system further comprises at least one among a volume control, a tone control, and an output port on the radio receiver, wherein the output port can selectively stream data or audio or video from a selected channel among the plurality of channels from a single stream of data.

3. The system of claim 1, wherein the graphic user interface further comprises a program to selectively tag a desired type of content among the plurality of channels, analyze the data associated with the plurality of channels for an indication of content of the desired type among the plurality of channels, and alert a user of a desired channel containing the indication.

4. The system of claim 3, wherein the user is alerted by a pop-up window of the desired content on the desired channel.

5. The system of claim 1, wherein updates for the data associated with the plurality of channels recur in rapid succession.

6. The system of claim 1, wherein the graphical user interface enables the simultaneous viewing of a plurality of channel numbers, a plurality of artist names, a plurality of song titles, a plurality of channel names, a plurality of categories, and a plurality of use percentages of the channels among the plurality of channels.

7. The system of claim 1, wherein the graphical user interface enables the viewing of signal strength of a signal received from a satellite signal and a terrestrial signal.

8. The system of claim 1, wherein the data associated with the plurality of channels is extracted from a broadcast information channel received at the radio receiver as one of the plurality of channels.

9. The system of claim 1, wherein the data associated with the plurality of channels is extracted from a plurality of channel decoders performing background scanning among the plurality of channels to create a broadcast information channel from the single data stream using the single radio receiver.

10. The system of claim 1, wherein the radio receiver is a satellite digital audio receiver.

11. The system of claim 1, wherein the system further comprises a global network connection.

12. The system of claim 1, wherein the computer controls the radio receiver.

13. A computer based multi-channel radio, comprising:
a single digital audio radio receiver for receiving a plurality of channels and data associated with the plurality of channels over-the-air;
a channel decoder coupled to the radio receiver; and
a port for transmitting data associated with the plurality of channels, transmitting an output signal representative of selected channels among the plurality of channels, and for receiving control signals from a computer having a graphical user interface,
wherein the data associated with the plurality of channels includes a plurality of channel numbers, a plurality of artist names, a plurality of song titles, a plurality of use percentages and a plurality of channel names, and
wherein the graphical user interface displays, for each channel from said plurality of channels, a channel number, a channel name, and at least one of a song title, an artist name and a use percentage.

14. The radio of claim 13, wherein the data associated with the plurality of channels is extracted from a broadcast information channel received at the radio receiver from a single data stream as one of the plurality of channels.

15. The radio of claim 13, wherein the data associated with the plurality of channels is extracted from a channel decoder in the radio performing background scanning among the plurality of channels and the output signal representative of the selected channel is an audio output.

16. A method of representing a plurality of channels on a display, comprising:
extracting data associated with each channel in the plurality of channels from a data stream using a single digital audio radio receiver;
enabling the selective display of the data associated with each of the plurality of channels on a graphical user interface;
simultaneously updating and displaying the associated data for a selected plurality of at least three channels among the plurality of channels, wherein the data associated with the plurality of channels includes a plurality of channel numbers, a plurality of artist names, a plurality of song titles, a plurality of use percentages and a plurality of channel names; and
selectively controlling a remotely coupled channel decoder on a radio receiver via the graphical user interface.

17. The method of claim 16, wherein said enabling the selective display of the data comprises simultaneously displaying a plurality of channel numbers, a plurality of artist names, a plurality of song titles, a plurality of channel names, a plurality of categories, and a plurality of use percentage of the channels among the plurality of channels.

18. The method of claim 16, wherein the graphical user interface includes a plurality of selectable tabs to enable the viewing of a plurality of channels belonging to predetermined categories selected from the group of categories including all, music, news, talk, last 10, favorites, traffic, weather, video, rock, classical, jazz, kids, comedy, and user customizable.

19. The method of claim 16, wherein the method further comprises extracting a signal strength measurement from the radio receiver and displaying the measurement from a terrestrial source and a satellite source on a screen of the graphical user interface.

20. A method of displaying a group of selected channels among a plurality channels, comprising:
controlling a remote source for receiving a single digitally encoded bit stream on at least a portion of the plurality of channels and decoding a selected channel among the plurality of channels using a digital audio radio receiver;
selectively displaying data associated with each selected channel on a graphical user interface wherein the data associated with the plurality of channels includes at least a plurality of channel numbers, a plurality of artist names, a plurality of song titles, a plurality of use percentages and a plurality of channel names, and said data displayed for each selected channel includes a channel number, a channel name, and at least one of a song title, an artist name and a use percentage; and
updating and displaying the data associated with the plurality of channels in a rapid recurring succession.

21. The method of claim 20, wherein the method further comprises of selectively tagging a desired type of content on the selected channel by analyzing a broadcast information channel and/or an Electronic Program Guide for an indication of content of the desired type among the plurality of channels.

22. The method of claim 21, further comprising alerting a user of a desired channel containing the indication.

23. The method of claim 22, wherein said tagging further comprises the step of storing descriptors representative of the content on the selected channel in a memory.

24. The method of claim 20, wherein said selectively displaying data associated with each of the plurality of channels comprises simultaneously displaying data associated with at least two of the plurality of channels.

25. A machine-readable storage, having stored thereon a computer program having a plurality of code sections executable by a machine for causing the machine to perform a method comprising:
extracting data associated with each channel in the plurality of channels from a single data stream using a digital audio radio receiver;
enabling the selective display of the data associated with each of the plurality of channels on a graphical user interface;
simultaneously updating and displaying of associated data for a selected plurality of channels among the plurality of channels wherein the data associated with the plurality of channels includes at least a plurality of channel numbers, a plurality of artist names, a plurality of song titles, and a plurality of channel names, and said updated and displayed associated data includes a channel number, a channel name, and at least one of a song title, an artist name and a use percentage; and
selectively controlling a remotely coupled channel decoder on a radio receiver via the graphical user interface.

26. A machine-readable storage, having stored thereon a computer program having a plurality of code sections executable by a machine for causing the machine to perform the steps of:

controlling a remote source for receiving a single digitally encoded bit stream on at least a portion of a plurality of channels and decoding a selected channel among the plurality of channels using a digital audio radio receiver;

selectively displaying data associated with each of the plurality of channels on a graphical user interface wherein the data associated with the plurality of channels includes at least a plurality of channel numbers, a plurality of artist names, a plurality of song titles, and a plurality of channel names, and said selectively displayed associated data includes a channel number, a channel name, and at least one of a song title, an artist name and a use percentage;

updating and displaying the data associated with the plurality of channels in a rapid recurring succession; and enabling the output of the selected channel as represented by the graphical user interface.

* * * * *